(12) United States Patent
Masutani et al.

(10) Patent No.: US 8,366,929 B2
(45) Date of Patent: Feb. 5, 2013

(54) SPACING MEMBER, MEMBRANE ELEMENT, AND SUBMERGED MEMBRANE SEPARATION DEVICE

(75) Inventors: Hidetoshi Masutani, Amagasaki (JP); Yasunobu Okajima, Amagasaki (JP); Tadao Shinkai, Amagasaki (JP); Yoshio Asakura, Amagasaki (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/139,523

(22) PCT Filed: Dec. 21, 2009

(86) PCT No.: PCT/JP2009/007040
§ 371 (c)(1),
(2), (4) Date: Jun. 14, 2011

(87) PCT Pub. No.: WO2010/079558
PCT Pub. Date: Jul. 15, 2010

(65) Prior Publication Data
US 2011/0240538 A1    Oct. 6, 2011

(30) Foreign Application Priority Data
Jan. 6, 2009   (JP) .................................. 2009-000475

(51) Int. Cl.
*B01D 35/30* (2006.01)
*B01D 65/02* (2006.01)
*B01D 63/08* (2006.01)

(52) U.S. Cl. ........ 210/232; 210/200; 210/203; 210/230; 210/231; 210/323.1; 210/340; 210/346

(58) Field of Classification Search .................. 210/232, 210/240, 321.6
See application file for complete search history.

(56) References Cited

FOREIGN PATENT DOCUMENTS

| JP | 06-218247 | 8/1994 |
| JP | 08-089766 | 4/1996 |
| JP | 08-192032 | 7/1996 |
| JP | 2000-237551 | 9/2000 |
| JP | 2001-104759 | 4/2001 |

OTHER PUBLICATIONS

Int'l Search Report from corresponding Int'l Patent Application No. PCT/JP2009/007040, 2 Pages.

*Primary Examiner* — John Kim
(74) *Attorney, Agent, or Firm* — Kusner & Jaffe

(57) ABSTRACT

A membrane element 36 includes filtration membranes 45 on the flat part of the membrane element 36. Spacing members 60 keep spacing S between the filtration membranes 45 between the membrane elements 36 when the membrane elements 36 are arranged with the filtration membranes 45 opposed to each other. The spacing members 60 each have spacer sections 61a and 61b that keep the spacing S between the filtration membranes 45 between the membrane elements 36 in the direction of a membrane surface cleaning stream that flows along the surface of the filtration membrane 45.

5 Claims, 23 Drawing Sheets

SPACING MEMBER, MEMBRANE ELEMENT, AND SUBMERGED MEMBRANE SEPARATION DEVICE

TECHNICAL FIELD

The present invention relates to spacing members that keep spacing between membrane elements for filtering a liquid to be treated, membrane elements provided with the spacing members, and submerged membrane separation devices.

BACKGROUND ART

In the related art, as shown in FIGS. 19 and 20, submerged membrane separation device is installed in a treatment tank and submerged in water 12 to be treated, e.g., sewage. A submerged membrane separation device 13 includes multiple membrane elements 14 and multiple membrane joining/fixing members 15. The membrane elements 14 are arranged at predetermined spacing in the thickness direction. The membrane joining/fixing members 15 are disposed on both ends of the membrane elements 14. The ends of the membrane elements 14 are joined and connected by the membrane joining/fixing members 15.

The membrane elements 14 are flat plates or sheets, each having filtration membranes 16 on the front and back sides. The membrane joining/fixing member 15 has a water collecting pipe 17 for collecting water permeated through the filtration membranes 16. On the upper end of the water collecting pipe 17, a suction pipe 18 is formed. Further, an air diffuser 19 is provided below the membrane elements 14.

Pressures in the membrane elements 14 are reduced from the suction pipes 18 by, e.g., a suction pump to enable the filtration membranes 16 to capture solid contents such as sludge in the water 12 to be treated. Subsequently, water having permeated through the filtration membranes 16 and flown into the membrane elements 14 is collected as treated water in the water collecting pipe 17, and then the treated water is drained out of the water collecting pipe 17 through the suction pipe 18.

At this point, air sent from the air diffuser 19 produces an air-lift effect to generate upward flows 20 in a gas-liquid phase between the membrane elements 14. The upward flows 20 clean the membrane surfaces of the membrane elements 14.

The submerged membrane separation device 13 further includes spacing members 21 that keep spacing between the filtration membranes 16 between the adjacent membrane elements 14. As shown in FIGS. 20 and 21, the spacing members 21 are comb-like members having teeth 22 and are respectively attached to the upper and lower ends of the membrane elements 14. The teeth 22 of the upper spacing member 21 are inserted between the upper ends of the membrane elements 14 and the teeth 22 of the lower spacing member 21 are inserted between the lower ends of the membrane elements 14.

With this configuration, the upper spacing member 21 keeps spacing 23a between the upper ends of the membrane elements 14 at predetermined spacing and the lower spacing member 21 keeps spacing 23b between the lower ends of the membrane elements 14 at the predetermined spacing.

The submerged membrane separation device 13 including the spacing members 21 is described in, e.g., Patent Literature 1.

Citation List
Patent Literature

Patent Literature 1: Japanese Patent Laid-Open No. 2000-237551

SUMMARY OF INVENTION

Technical Problem

In the system of the related art, however, spacing between the filtration membranes 16 between the adjacent membrane elements 14 is kept at the predetermined spacing only on the upper and lower ends of the adjacent membrane elements 14. The predetermined spacing is not always kept over the membrane elements 14, that is, from the upper ends to the lower ends of the membrane elements 14. For example, in the case where a thickness T of the membrane element 14 is reduced to increase the number of membrane elements 14 attached per unit area, the membrane elements 14 are reduced in stiffness. As indicated by virtual lines in FIG. 21, the membrane elements 14 are bent (deformed) by a force of, e.g., the upward flows 20, so that spacing 23c at a central part between the upper and lower ends of the membrane element 14 cannot be kept at the predetermined spacing. Consequently, at the central part not kept at the predetermined spacing, the membrane surface cleaning effect of the upward flows 20 is lessened to cause buildup of solid contents such as sludge in the water 12 to be treated, leading to clogging between the membranes. This problem occurs also in the case where the membrane elements 14 are increased in size.

As shown in FIG. 19, the upward flows 20 used as membrane surface cleaning streams for cleaning the membrane surfaces of the filtration membranes 16 turn downward as downward flows 27 outside the membrane joining/fixing members 15 after passing between the membrane elements 14. Thus the upward flows 20 concentrate near the membrane joining/fixing members 15 and decrease at a central part in width direction W of the membrane element 14, so that the membrane surface cleaning effect is insufficient at the central part in the width direction W of the membrane element 14.

An object of the present invention is to provide a spacing member, a membrane element, and a submerged membrane separation device which can keep predetermined spacing between filtration membranes between adjacent membrane elements in the direction of a membrane surface cleaning stream, and obtain a sufficient membrane surface cleaning effect substantially uniformly in the width direction of the membrane element.

Solution to Problem

In order to attain the object, a spacing member according to a first aspect of the present invention is a spacing member keeping spacing between filtration membranes between membrane elements arranged with the filtration membranes opposed to each other, the membrane element having the filtration membranes on the flat part of the membrane element, the spacing member including at least one spacer section keeping the spacing between the filtration membranes between the membrane elements in the direction of a membrane surface cleaning stream flowing along the filtration membrane surface of the membrane element.

With this configuration, the spacer section of the spacing member is disposed between the membrane elements, thereby keeping the spacing between the filtration membranes between the membrane elements (that is, spacing between the opposed filtration membranes of the membrane elements) across the membrane element at predetermined spacing. At this point, the spacer section is disposed between the membrane elements in the direction of the membrane surface cleaning stream of the membrane element, thereby keeping the spacing between the filtration membranes between the membrane elements at the predetermined spacing in the direction of the membrane surface cleaning stream of the membrane element. The predetermined spacing is, e.g., regular spacing set in design and so on.

The spacing member according to a second aspect of the present invention, wherein the at least one spacer section is disposed between the membrane elements over the height of the membrane element.

The spacing member according to a third aspect of the present invention, wherein the at least one spacer section is detachably attached to the membrane element.

This configuration facilitates fabrication and maintenance of a membrane module.

The spacing member according to a fourth aspect of the present invention, wherein the at least one spacer section includes multiple spacer sections, each being disposed between the different membrane elements.

With this configuration, the spacer sections of the spacing member are simultaneously inserted or removed between the membrane elements, facilitating fabrication and maintenance of the membrane module.

The spacing member according to a fifth aspect of the present invention includes a fastening device for fastening the at least one spacer section on the membrane element.

With this configuration, the spacer section is attached to the membrane element and is fixed thereon by the fastening device, thereby preventing the spacing member from accidentally falling off the membrane element.

The spacing member according to a sixth aspect of the present invention, wherein the at least one spacer section is integrally formed with the membrane element.

A membrane element according to a seventh aspect of the present invention includes filtration membranes, wherein the spacing member according to any one of the first to sixth aspects of the present invention keeps the spacing between the filtration membranes between the membrane elements.

A submerged membrane separation device according to an eighth aspect of the present invention, including the membrane elements of the seventh aspect, the membrane elements being submerged for membrane filtration in a liquid to be treated,
the submerged membrane separation device further including an air diffuser below the membrane elements, the air diffuser diffusing air to generate upward flows as membrane surface cleaning streams, the upward flows cleaning the filtration membrane surface.

With this configuration, the air diffusion of the air diffuser generates upward flows in a gas-liquid phase between the membrane elements by an air-lift effect and the upward flows clean the membrane surfaces of the membrane elements. In this case, the spacing members divide the area of the upward flows into multiple sections in the width direction of the membrane element. Thus the upward flows acting as the membrane surface cleaning streams for cleaning the filtration membrane surfaces are generated along the membrane surfaces of the membrane elements in the sections separated by the spacing members and the concentrated flows are dispersed to generate substantially uniform flows in the width direction of the membrane element. Consequently, a membrane surface cleaning effect can be sufficiently obtained in the width direction of the membrane element.

Advantageous Effects of Invention

As has been discussed, according to the present invention, the spacer sections of a spacing member are provided across a membrane element in the direction of a membrane surface cleaning stream, thereby keeping spacing between filtration membranes between membrane elements at predetermined spacing in the direction of the membrane surface cleaning stream.

Further, upward flows used as membrane surface cleaning streams are generated along the membrane surfaces of the membrane elements in the sections separated by the spacing members, so that the concentration of upward flows in the width direction of the membrane element can be suppressed and a membrane surface cleaning effect can be sufficiently obtained in the width direction of the membrane element.

DESCRIPTION OF EMBODIMENTS (First Embodiment)

Referring to FIGS. 1 to 5A and 5B, a first embodiment of the present invention will be described below.

Figure 1:
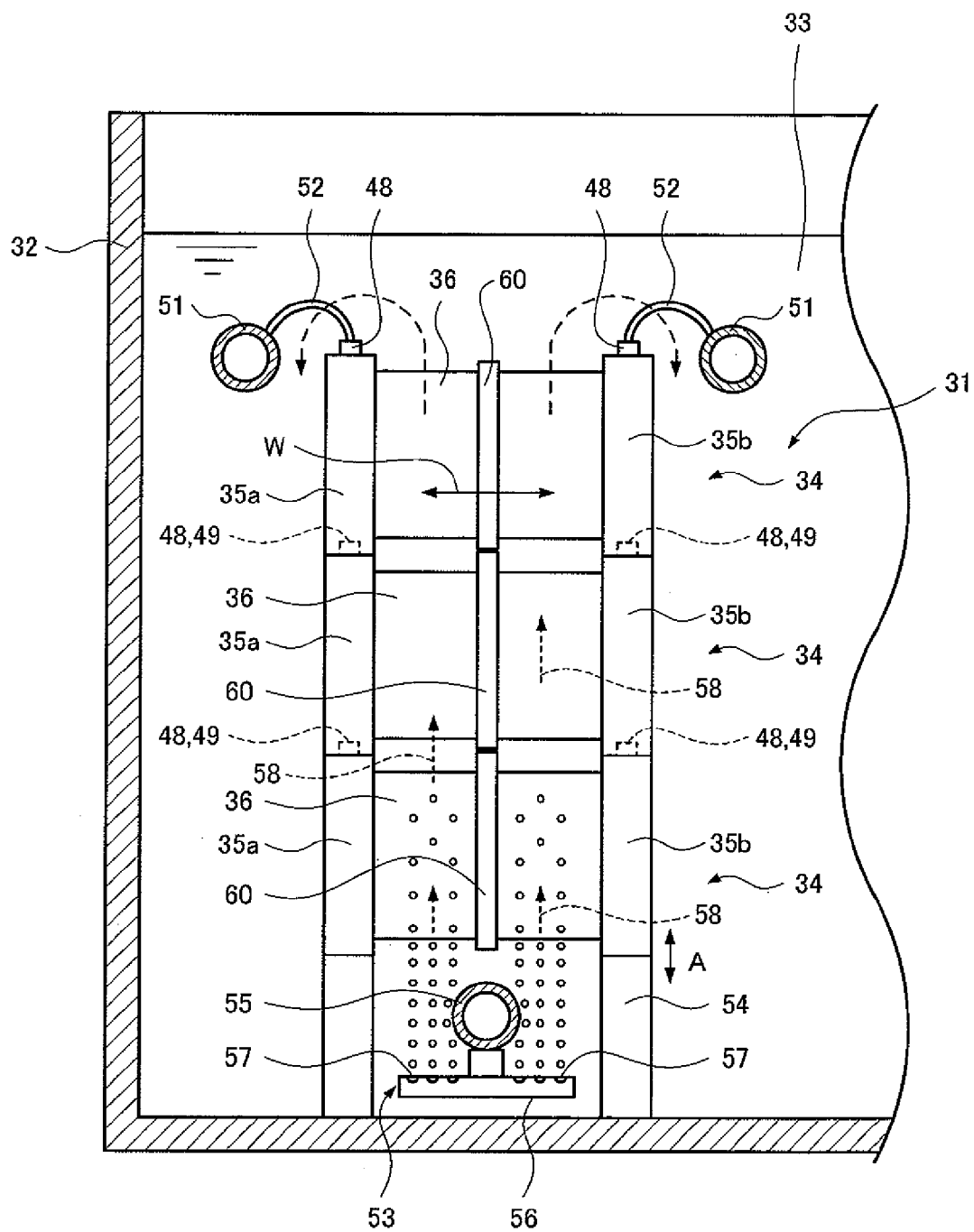
FIG. 1 is a front view showing a submerged membrane separation device according to a first embodiment of the present invention.

As shown in FIG. 1, reference numeral 31 denotes a submerged membrane separation device for membrane filtration. The submerged membrane separation device 31 is submerged in a liquid 33 to be treated, e.g., organic waste water and is installed in a treatment tank 32. The submerged membrane separation device 31 includes multiple membrane modules 34 stacked in vertical direction A.

Figure 2:
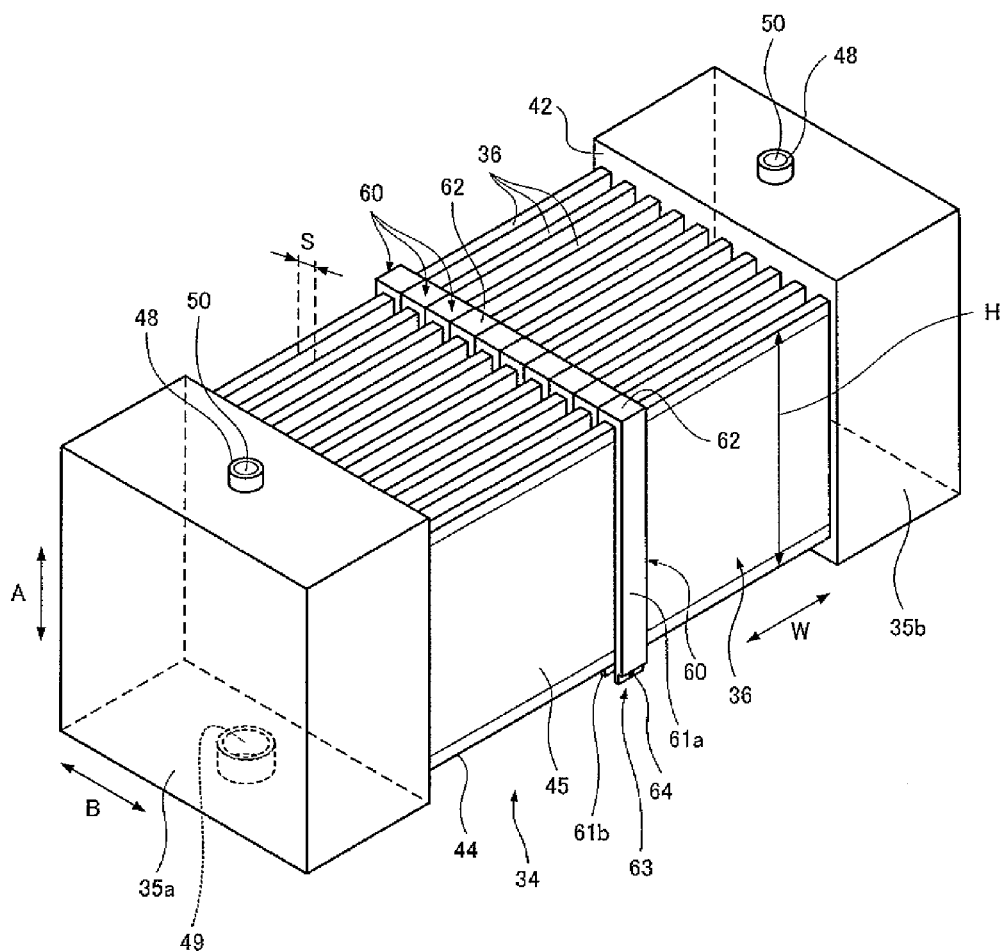
FIG. 2 is a perspective view showing a membrane module of the submerged membrane separation device with spacing members attached to the membrane module, according to the first embodiment of the present invention.
Figure 3:
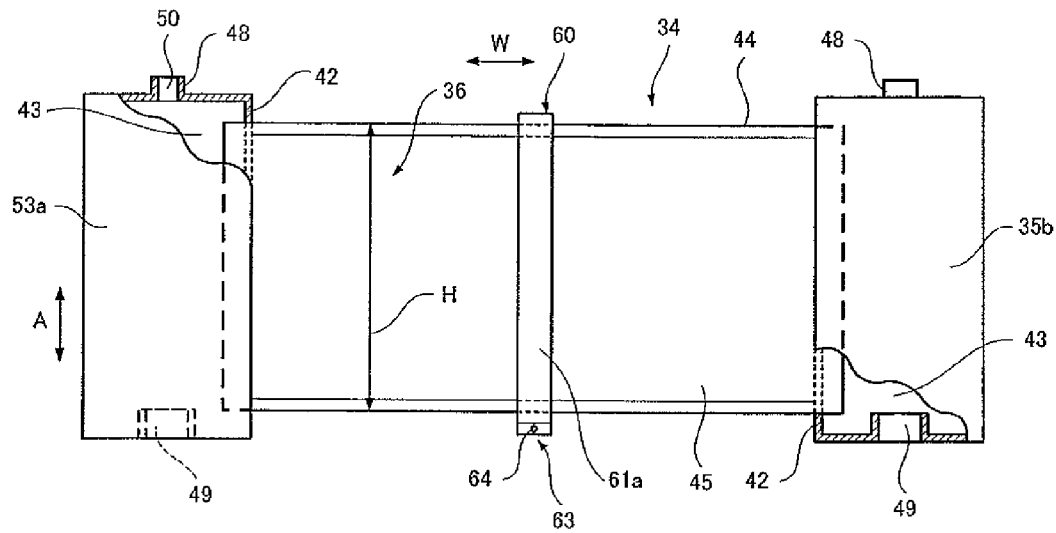
FIG. 3 is a partially cut front view showing the membrane module having the attached spacing members, according to the first embodiment of the present invention.
Figure 4:
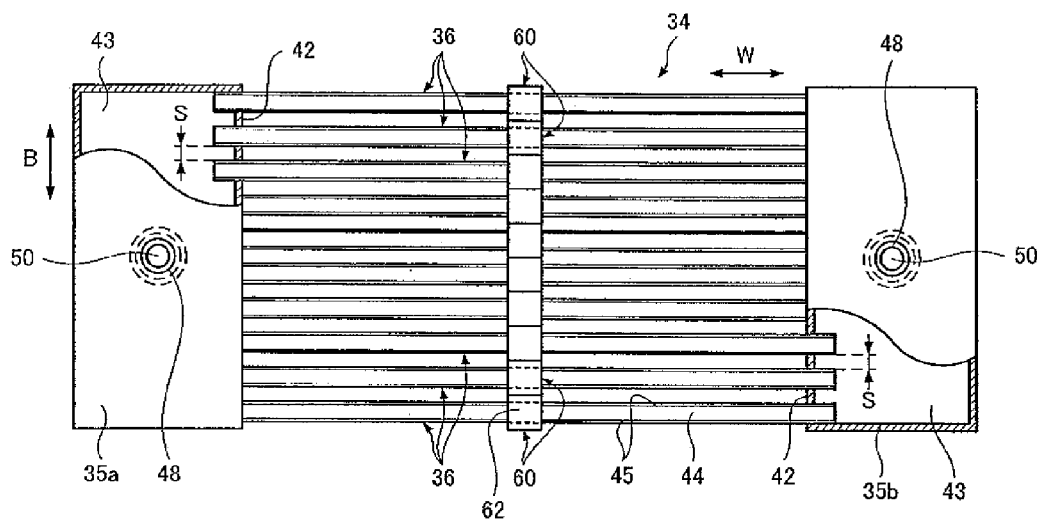
FIG. 4 is a partially cut plan view showing the membrane module having the attached spacing members, according to the first embodiment of the present invention.

As shown in FIGS. 2 to 4, the membrane module 34 includes a pair of water collecting cases 35a and 35b that are laterally arranged and multiple membrane elements 36 that are arranged and fixed between the water collecting cases 35a and 35b. The water collecting cases 35a and 35b are cubic members each of which contains a water collecting space 43.

The membrane elements 36 are arranged in parallel at predetermined spacing S in thickness direction B. The membrane element 36 includes a filtration plate 44 that is a rectangular plate and filtration membranes 45 that are flat membranes respectively attached to flat parts on the front and back sides of the filtration plate 44 by, e.g., welding. On each surface of the filtration plate 44, a permeated water passage is horizontally formed so as to communicate with the water collecting spaces 43. The permeated water passage is covered with the filtration membrane 45.

The water collecting cases 35a and 35b each include an inner plate 42 made of adhesive resin. As shown in FIG. 4, the lateral side edges of the membrane element 36 are inserted into the water collecting spaces 43 through the inner plates 42. Thus the membrane elements 36 are fixed to the water collecting cases 35a and 35b with water tightness and are supported between the water collecting cases 35a and 35b with the filtration membranes 45 opposed to each other.

On each of the upper ends of the water collecting cases 35a and 35b, a projecting portion 48 is provided so as to project upward. On each of the undersides of the water collecting cases 35a and 35b, a hole 49 is provided. In the projecting portion 48, a communicating hole 50 is formed that communicates with the outer surface of the upper end and the water collecting space 43. The holes 49 respectively communicate with the outer surfaces of the undersides of the water collecting cases 35a and 35b and the water collecting spaces 43. The projecting portion 48 of the lower membrane module 34 is detachably fit into the hole 49 of the upper membrane module 34 in the vertical direction A.

As shown in FIG. 1, the water collecting space 43 of the lower membrane module 34 communicates with the water collecting space 43 of the upper membrane module 34 through the communicating hole 50 of the projecting portion 48. Further, water collecting pipes 51 are respectively provided on the right and left sides of the top membrane module 34. The projecting portion 48 of the top membrane module 34 and the water collecting pipe 51 are connected to each other via a connecting pipe 52. The water collecting pipe 51 is connected to a permeated water collecting pipe that includes a suction pump.

Below the membrane elements 36 of the lowest membrane module 34, an air diffuser 53 is provided for diffusing air. The lowest membrane module 34 is supported on a diffusing case 54 that guides air from the air diffuser 53 to the upper membrane module 34. The hole 49 of the lowest membrane module 34 is closed.

The air diffuser 53 includes a horizontal main pipe 55 that receives air from an air supplier (e.g., a blower) and multiple branch pipes 56 orthogonal to the main pipe 55. The branch pipe 56 includes multiple air outlets 57 for diffusing air.

Figure 5A:
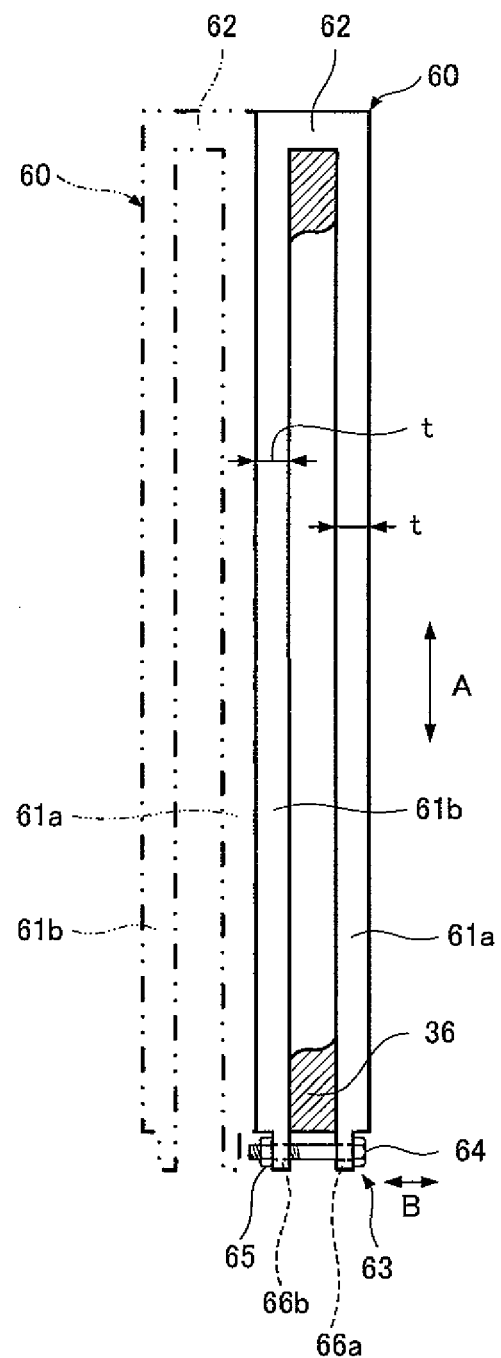
FIG. 5A is a side view showing the spacing member attached to the membrane module, according to the first embodiment of the present invention.
Figure 5B:
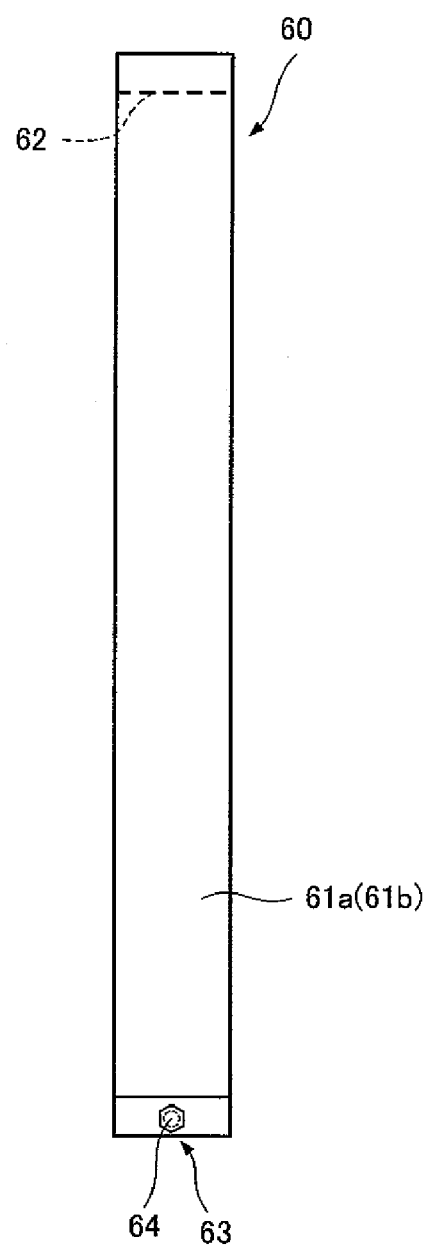
FIG. 5B is a front view showing the spacing member attached to the membrane module, according to the first embodiment of the present invention.

The membrane module 34 includes multiple detachable spacing members 60, each keeping the spacing S between the filtration membranes 45 between the adjacent membrane elements 36. The spacing S between the filtration membranes 45 between the adjacent membrane elements 36 is spacing between the filtration membranes 45 of the opposed membrane elements 36. As shown in FIGS. 5A and 5B, the spacing member 60 has a pair of spacer sections 61a and 61b extended in the vertical direction A (an example of the direction of a membrane surface cleaning stream), a connecting portion 62 that connects the upper ends of the spacer sections 61a and 61b, and a fastening device 63 that fastens the spacing member 60 on the membrane element 36.

The spacer sections 61a and 61b are removably inserted between the membrane elements 36 and are interposed between the membrane elements 36 over a height H of the membrane element 36. The lower ends of the spacer sections 61a and 61b are extended lower than the lower end of the membrane element 36.

The fastening device 63 includes a bolt 64 attached across the lower ends of the spacer sections 61a and 61b and a nut 65 screwed onto the bolt 64. The bolt 64 is removably inserted into bolt holes 66a and 66b formed at the lower ends of the spacer sections 61a and 61b, in thickness direction B of the membrane element 36.

The effect of the configuration will be described below.

The spacing members 60 are each attached from above the membrane element 36 to insert the membrane element 36 between the spacer sections 61a and 61b, and the spacing members 60 are arranged in a straight line along the thickness direction B of the membrane element 36. Thus the spacer section 61a of one of the adjacent spacing members 60 and the spacer section 61b of the other spacing member 60 are inserted between the membrane elements 36 and are disposed therebetween over the height H of the membrane element 36, thereby keeping the spacing S between the filtration membranes 45 between the adjacent membrane elements 36 at the predetermined spacing over the height H (an example of the direction of the membrane surface cleaning stream). The spacer sections 61*a* and 61*b* have a thickness t that is a half of the predetermined spacing (S/2) between the membrane elements 36.

As has been discussed, the spacer sections 61*a* and 61*b* of the spacing member 60 are inserted between the membrane elements 36, the bolt 64 is inserted into the bolt holes 66*a* and 66*b*, and the nut 65 is screwed onto the bolt 64, so that the bolt 64 below the membrane element 36 is orthogonal to the membrane element 36. The spacing member 60 is fixed thus on the membrane element 36 in the vertical direction A.

After the spacing members 60 are attached thus to the membrane modules 34, the membrane modules 34 are stacked to complete the membrane separation device 31 as shown in FIG. 1 and are submerged in the liquid 33 to be treated in the treatment tank 32. After that, the suction bump is driven to supply air from the air supplier to the air diffuser 53, starting a filtering operation.

Thus pressures in the membrane elements 36 are reduced and solid contents such as sludge in the liquid 33 to be treated are captured by the filtration membranes 45 of the membrane elements 36. Permeated water through the filtration membranes 45 flows into the permeated water passages of the membrane elements 36, and then the permeated water flows into the water collecting spaces 43 of the water collecting cases 35*a* and 35*b* from the permeated water passages as the treated water.

The projecting portions 48 of the lower membrane module 34 are fit into the holes 49 of the upper membrane module 34, and the water collecting spaces 43 of the lower membrane module 34 communicate with the water collecting spaces 43 of the upper membrane module 34 through the communicating holes 50 of the projecting portions 48. Thus the permeated water (that is, treated water) collected in the water collecting spaces 43 of the lower membrane module 34 passes through the communicating holes 50, flows into the water collecting spaces 43 of the upper membrane module 34 from the water collecting spaces 43 of the lower membrane module 34, flows into the water collecting pipes 51 from the water collecting spaces 43 of the top membrane module 34 through the connecting pipes 52, and then flows into the permeated water collecting pipes from the water collecting pipes 51. After that, that water is collected out of the treatment tank 32.

Further, air from the air outlets 57 of the air diffuser 53 floats up as air bubbles, generating upward flows 58 (an example of the membrane surface cleaning stream) in a gas-liquid phase between the membrane elements 36. The upward flows 58 along the surfaces of the filtration membranes 45 of the membrane elements 36 clean the membrane surfaces of the membrane elements 36, thereby preventing buildup of solid contents such as sludge on the membrane surfaces of the membrane elements 36. At this point, the upward flows 58 apply an upward force to the spacing members 60 but the bolts 64 of the fastening devices 63 come into contact with the undersides of the membrane elements 36, thereby preventing the spacing members 60 from accidentally falling off the membrane elements 36 upward.

Moreover, it is possible to prevent the upper or lower parts of the membrane elements 36 from cracking or wearing due to stress concentration.

(Second Embodiment)

Figure 6:
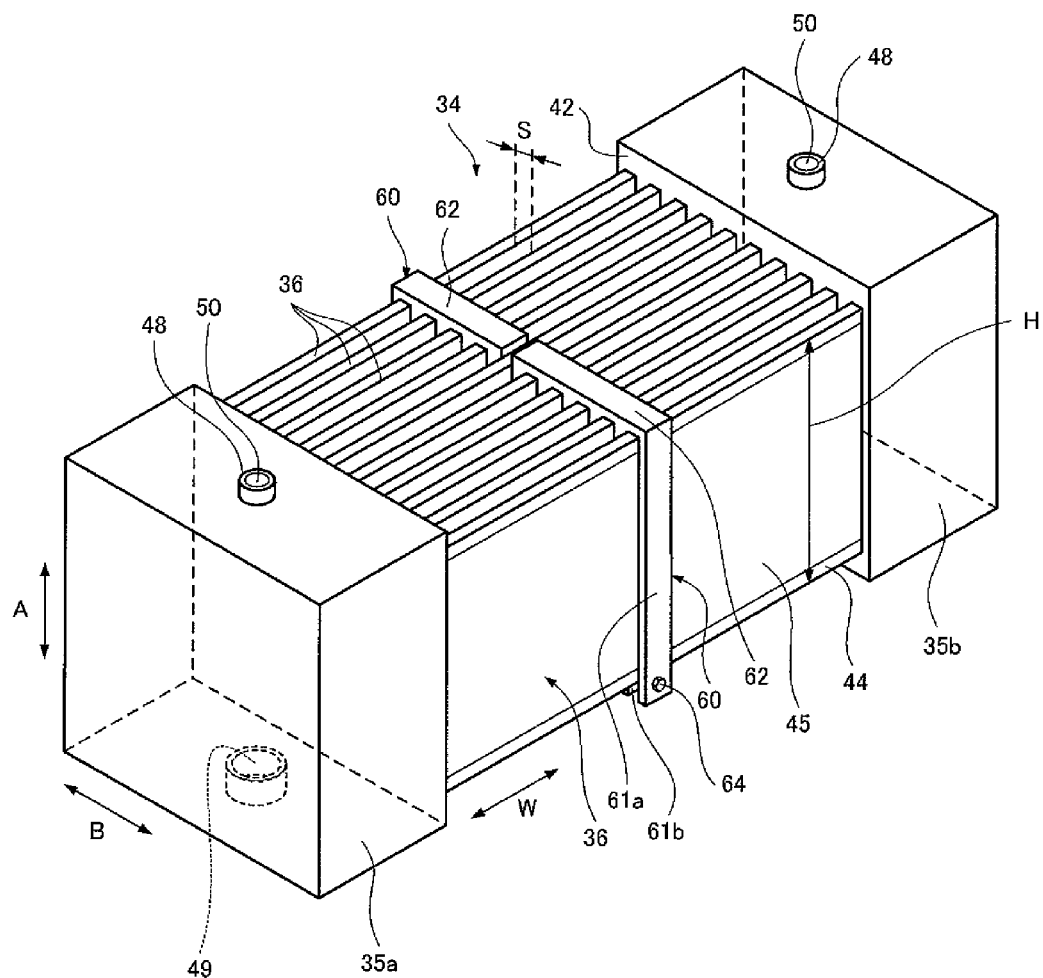
FIG. 6 is a perspective view showing a membrane module having attached spacing members according to a second embodiment of the present invention.
Figure 7A:
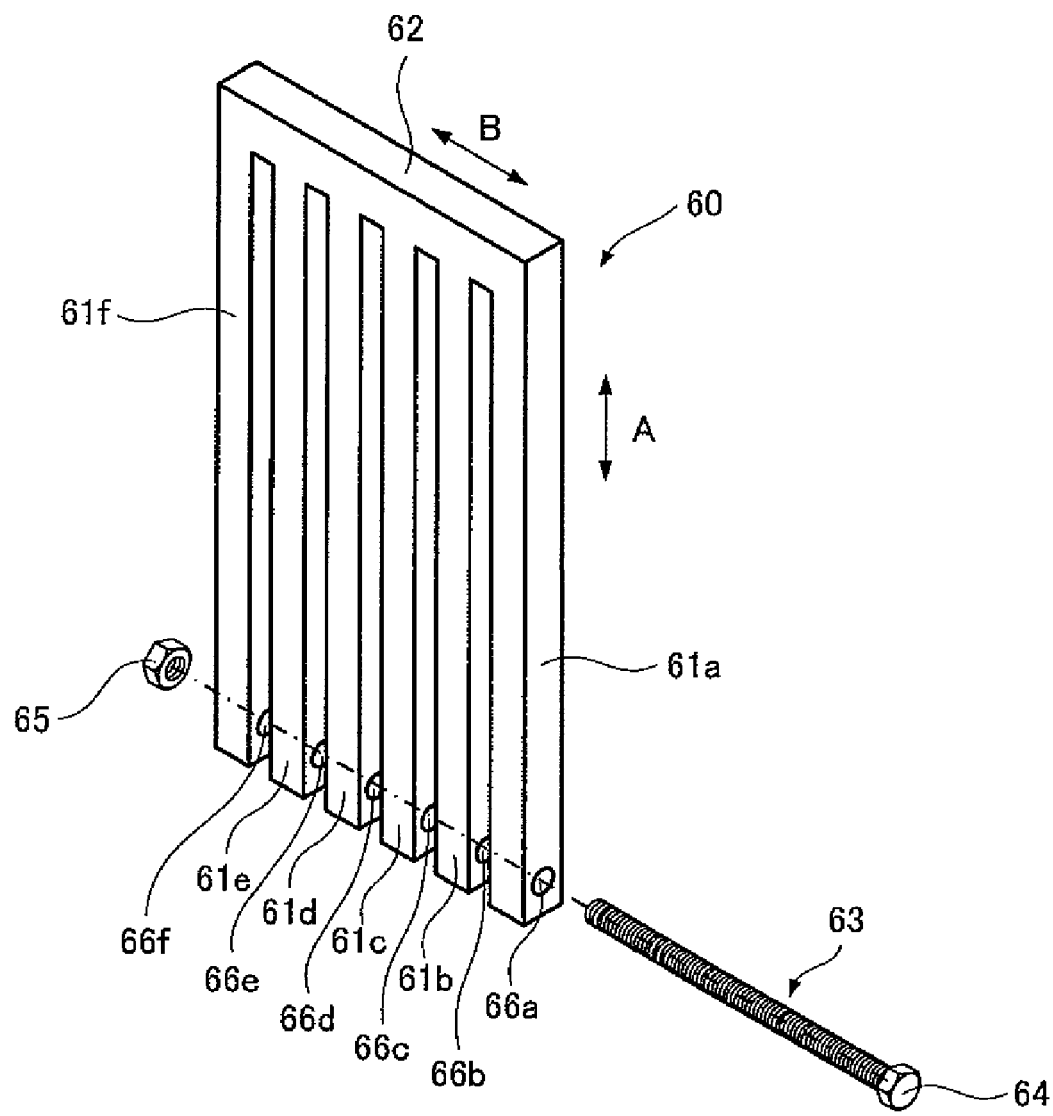
FIG. 7A is a perspective view showing the spacing member attached to the membrane module, according to the second embodiment of the present invention.
Figure 7B:
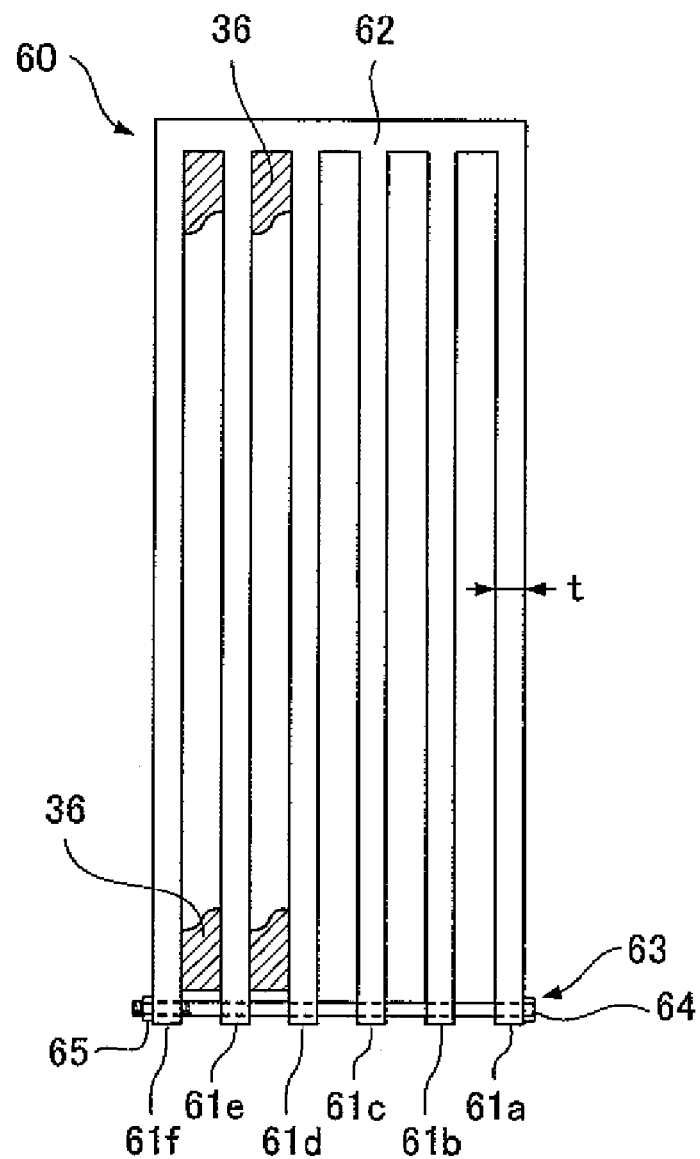
FIG. 7B is a side view showing the spacing member attached to the membrane module, according to the second embodiment of the present invention.

Referring to FIGS. 6, 7A, and 7B, a second embodiment of the present invention will be described below.

In the first embodiment, the spacing member 60 includes the pair of spacer sections, that is, the two spacer sections 61*a* and 61*b*, whereas in the second embodiment, as shown in FIGS. 7A and 7B, a spacing member 60 is shaped like a comb having at least two spacer sections 61*a* to 61*f*. The upper ends of the spacer sections 61*a* to 61*f* are connected by a connecting portion 62 extended in thickness direction B of a membrane element 36.

A fastening device 63 includes a bolt 64 attached across the lower ends of the spacer sections 61*a* to 61*f*, and a nut 65 screwed onto the bolt 64. The bolt 64 is removably inserted into bolt holes 66*a* to 66*f* formed on the lower ends of the spacer section 61*a* to 61*f*, in the thickness direction B of the membrane element 36.

The effect of the configuration will be described below.

As shown in FIG. 6, the spacer sections 61*a* to 61*f* of the spacing members 60 are inserted between the different membrane elements 36 from above. Thus spacing S between filtration membranes 45 between the membrane elements 36 is kept at predetermined spacing over a height H of the membrane element 36. The spacer sections 61*a* to 61*f* have a thickness t that is equal to the predetermined spacing S between the membrane elements 36.

The spacer sections 61*a* to 61*f* are simultaneously inserted or removed between the membrane elements 36, facilitating fabrication and maintenance of a membrane module 34.

The bolt 64 is inserted into the bolt holes 66*a* to 66*f* and the nut 65 is screwed onto the bolt 64, so that the bolt 64 is orthogonal to the membrane elements 36 below the membrane elements 36. The spacing member 60 is fastened thus on the membrane element 36 in vertical direction A.

In the second embodiment, as shown in FIGS. 7A and 7B, the spacing member 60 includes the six spacer sections 61*a* to 61*f*. The number of spacer sections is not limited to six as long as at least two spacer sections are provided.

(Third Embodiment)

Figure 8:
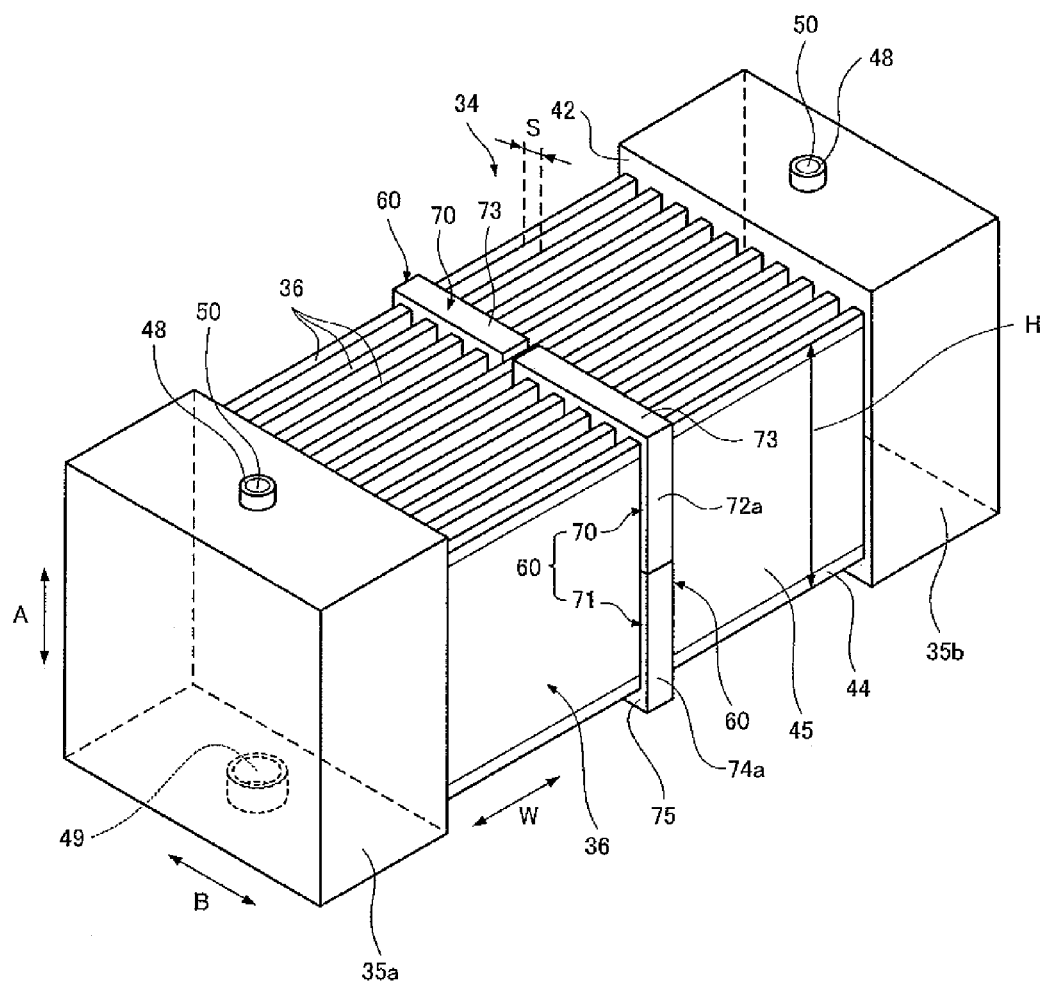
FIG. 8 is a perspective view showing a membrane module having attached spacing members according to a third embodiment of the present invention.
Figure 9A:
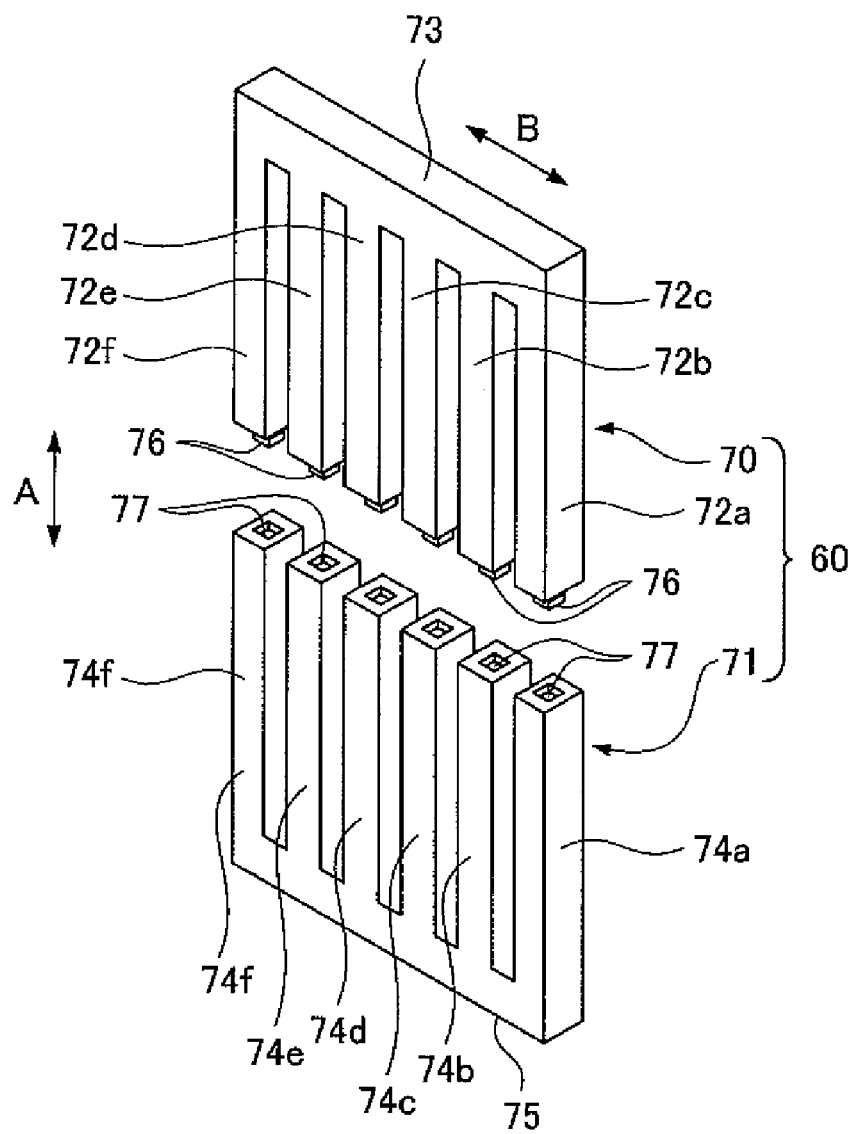
FIG. 9A is an exploded perspective view showing the spacing member attached to the membrane module, according to the third embodiment of the present invention.
Figure 9B:
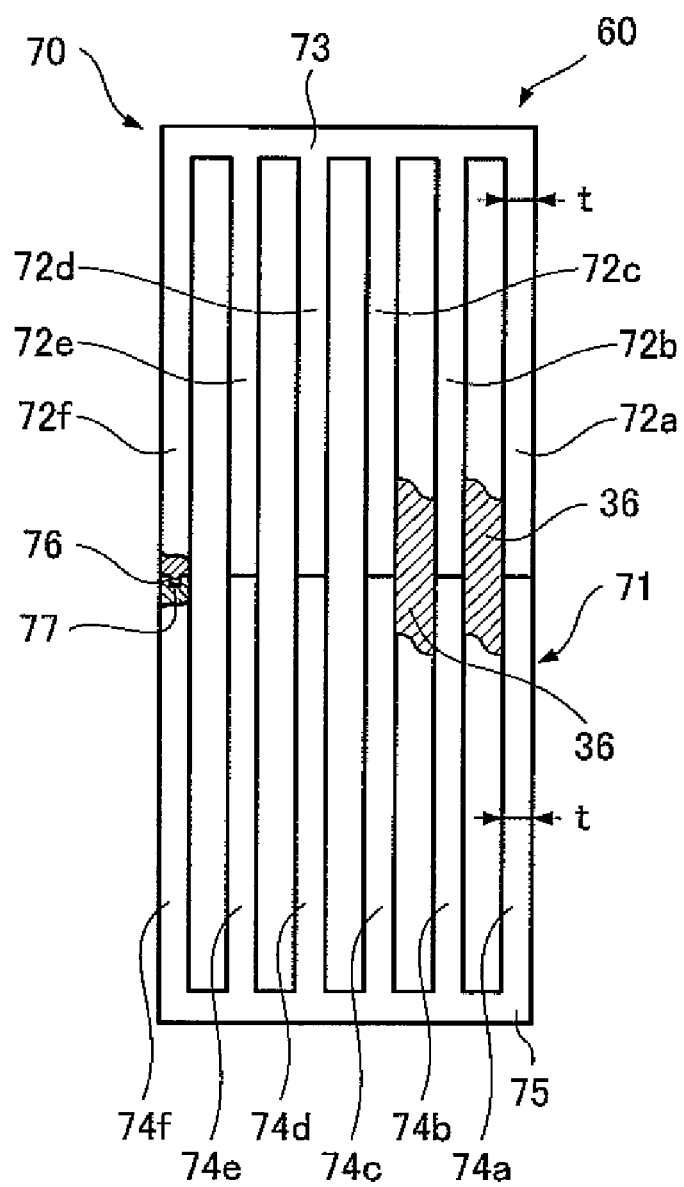
FIG. 9B is an assembly side view showing the spacing member attached to the membrane module, according to the third embodiment of the present invention.

Referring to FIGS. 8, 9A, and 9B, a third embodiment of the present invention will be described below.

A spacing member 60 is divided into an upper (one) spacing member 70 and a lower (other) spacing member 71. The upper spacing member 70 is shaped like a comb having multiple upper spacer sections 72*a* to 72*f*. The upper ends of the upper spacer sections 72*a* to 72*f* are connected by an upper connecting portion 73 extended in thickness direction B of a membrane element 36. On the respective lower ends of the upper spacer sections 72*a* to 72*f*, projecting portions 76 are formed so as to project downward.

The lower spacing member 71 is shaped like a comb having multiple lower spacer sections 74*a* to 74*f*, like the upper spacing member 70. The lower ends of the lower spacer sections 74*a* to 74*f* are connected by a lower connecting portion 75. On the respective upper ends of the lower spacer sections 74*a* to 74*f*, recessed portions 77 are formed. The projecting portions 76 are removably fit into the recessed portions 77 in vertical direction A.

The effect of the configuration will be described below.

The spacer sections 74*a* to 74*f* of the lower spacing member 71 are inserted between the membrane elements 36 from below and the spacer sections 72*a* to 72*f* of the upper spacing member 70 are inserted between the membrane elements 36 from above, so that the projecting portions 76 are fit into the respective recessed portions 77. The upper spacing member 70 and the lower spacing member 71 are joined to each other to constitute the spacing member 60, which keeps spacing S between filtration membranes 45 between the membrane elements 36 at predetermined spacing over a height H of the membrane element 36. The spacer sections 72*a* to 72*f* and 74*a* to 74*f* have a thickness t that is equal to the predetermined spacing S between the membrane elements 36.

In the third embodiment, as shown in FIGS. 9A and 9B, the upper spacing member 70 includes the six upper spacer sections 72*a* to 72*f*. The number of upper spacer sections is not limited to six as long as at least two upper spacer sections are provided. Similarly, the lower spacing member 71 includes the six lower spacer sections 74a to 74f and the number of lower spacer sections is not limited to six as long as at least two lower spacer sections are provided.

(Fourth Embodiment)

Figure 10:
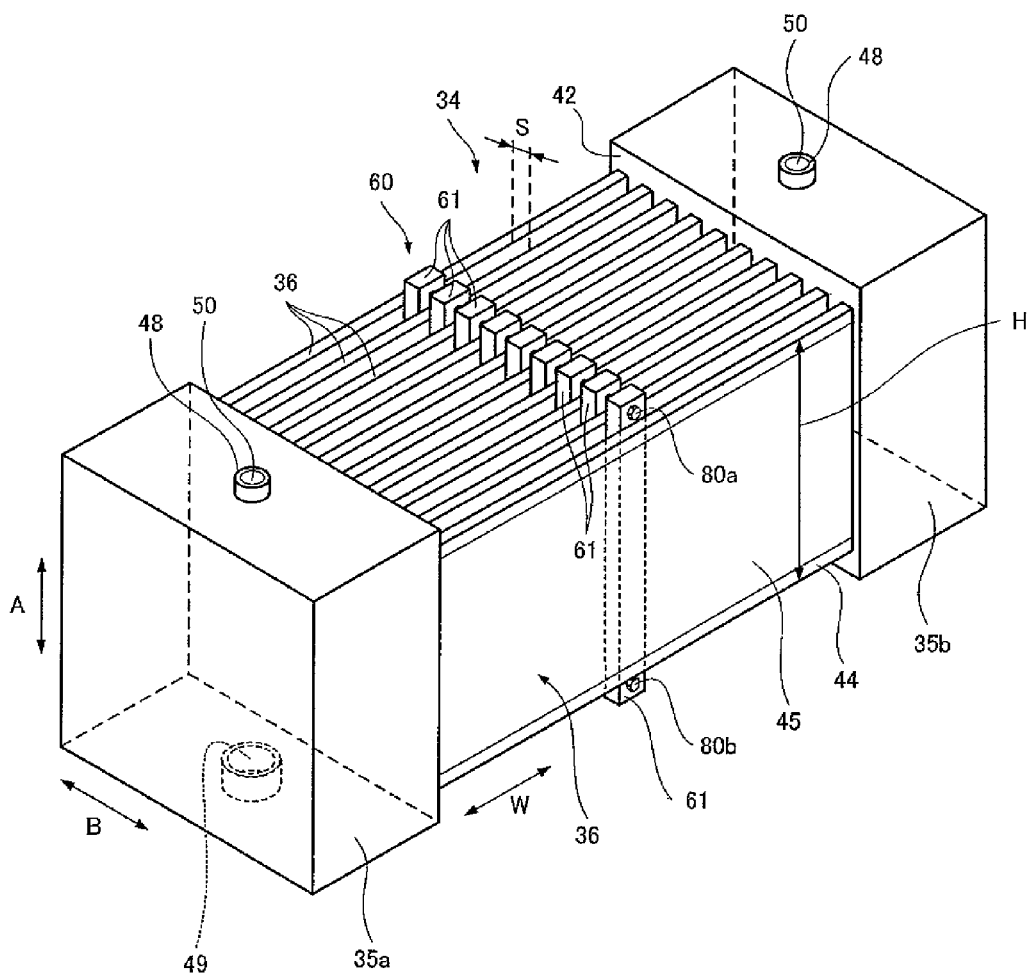
FIG. 10 is a perspective view showing a membrane module having attached spacing members according to a fourth embodiment of the present invention.
Figure 11:
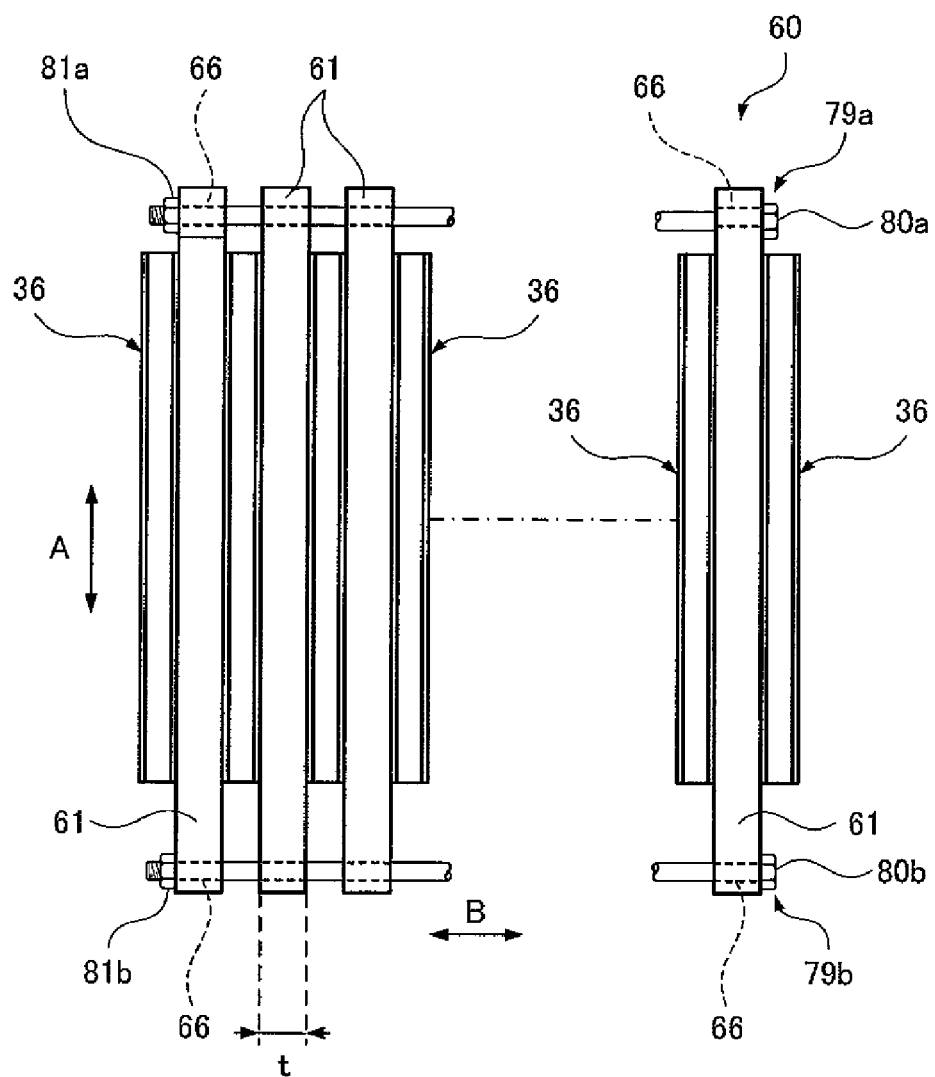
FIG. 11 is a partially omitted side view showing the spacing member attached to the membrane module, according to the fourth embodiment of the present invention.

Referring to FIGS. 10 and 11, a fourth embodiment of the present invention will be described below.

A spacing member 60 includes: multiple spacer sections 61, each being interposed between membrane elements 36 over a height H of the membrane element 36; and upper and lower fastening devices 79a and 79b that fasten the spacer sections 61 between the membrane elements 36.

The spacer section 61 is a rod extended in vertical direction A and has bolt holes 66 on both ends. The lower ends of the spacer sections 61 protrude below the lower ends of the membrane elements 36 and the upper ends of the spacer sections 61 protrude above the upper ends of the membrane elements 36.

The upper fastening device 79a has an upper bolt 80a inserted into the bolt holes 66 on the upper ends of the spacer sections 61 and an upper nut 81a screwed onto the upper bolt 80a. The lower fastening device 79b has a lower bolt 80b inserted into the lower bolt holes 66 on the lower ends of the spacer sections 61 and a lower nut 81b screwed onto the lower bolt 80b.

The effect of the configuration will be described below.

The upper bolt 80a is inserted into the bolt holes 66 on the upper ends of the spacer sections 61, and the spacer sections 61 in this state are inserted between the membrane elements 36 from above. After that, the lower bolt 80b is inserted into the bolt holes 66 on the lower ends of the spacer sections 61, the upper nut 81a is screwed onto the upper bolt 80a, and the lower nut 81b is screwed onto the lower bolt 80b.

The spacing member 60 is attached thus to a membrane module 34 to keep spacing S between filtration membranes 45 between the membrane elements 36 at predetermined spacing over the height H of the membrane element 36. The spacer sections 61 have a thickness t that is equal to the predetermined spacing S between the membrane elements 36.

The upper bolt 80a is extended above the membrane elements 36 in the arrangement direction (thickness direction B) of the membrane elements 36 and the lower bolt 80b is extended below the membrane elements 36 in the arrangement direction (thickness direction B) of the membrane elements 36. Thus the spacer sections 61 are fastened between the membrane elements 36 in the vertical direction A.

In the first to fourth embodiments, the spacing members 60 are detachably attached to the membrane elements 36. A spacing member 60 having a similar structure may be bonded and fixed to either or both of the filtration plate 44 and the filtration membrane 45 of the membrane element 36 with, e.g., an adhesive.

(Fifth Embodiment)

Figure 12:
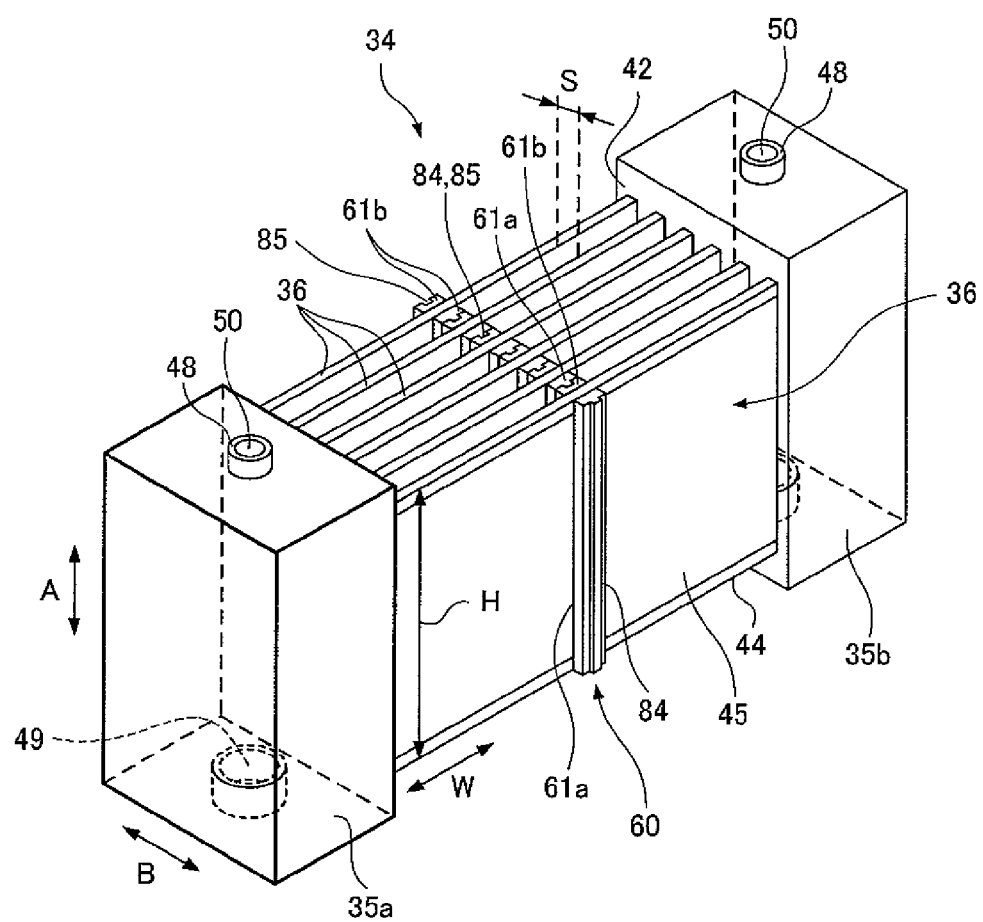
FIG. 12 is a perspective view showing a membrane module according to a fifth embodiment of the present invention.
Figure 13:
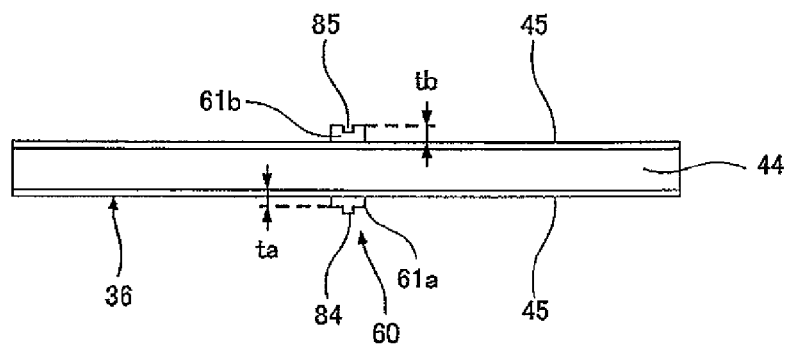
FIG. 13 is a plan view showing a membrane element of the membrane module, according to the fifth embodiment of the present invention.

Referring to FIGS. 12 and 13, a fifth embodiment of the present invention will be described below.

In the first to fourth embodiments, the spacing members 60 are detachably attached to the membrane elements 36, whereas in the fifth embodiment, spacing members 60 are integrally fixed on membrane elements 36.

As shown in FIGS. 12 and 13, the spacing member 60 includes a spacer section 61a integrally formed on one surface of the membrane element 36 and a spacer section 61b integrally formed on the other surface of the membrane element 36. The spacer sections 61a and 61b are respectively fixed on filtration membranes 45 with an adhesive or the like and are extended in vertical direction A over a height H of the membrane element 36.

On the end face of the spacer section 61a in thickness direction B of the membrane element 36, a projecting portion 84 is formed over the length of the spacer section 61a. On the end face of the spacer section 61b in the thickness direction B of the membrane element 36, a recessed portion 85 is formed over the length of the spacer section 61b. The projecting portion 84 on the spacer section 61a of one of the adjacent membrane elements 36 is fit into the recessed portion 85 on the spacer section 61b of the other membrane element 36.

In this configuration, the spacer section 61a of one of the membrane elements 36 opposed to each other in the thickness direction B comes into contact with the spacer section 61b of the other membrane element 36, and the spacer sections 61a and 61b are interposed between the membrane elements 36 over the height H of the membrane element 36.

Thus spacing S between the filtration membranes 45 between the membrane elements 36 can be kept at predetermined spacing over the height H. The predetermined spacing S between the membrane elements 36 is the sum of thickness ta from the membrane surface of the membrane element 36 (that is, from the surface of the filtration membrane 45) to the end face of the spacer section 61a and thickness tb from the membrane surface of the membrane element 36 to the end face of the spacer section 61b.

(Sixth Embodiment)

Figure 14:
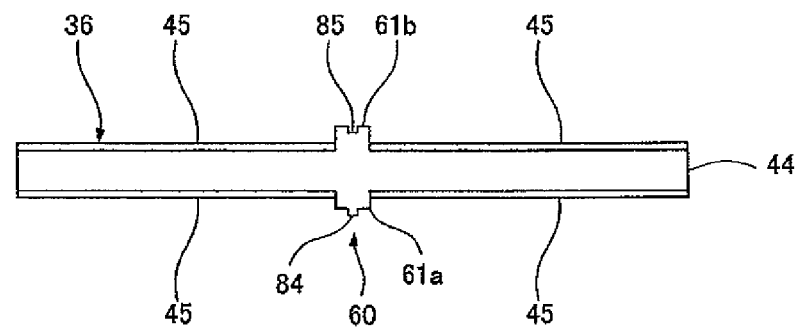
FIG. 14 is a plan view showing a membrane element of a membrane module according to a sixth embodiment of the present invention.

In the fifth embodiment, as shown in FIG. 13, the spacer sections 61a and 61b are formed on the filtration membranes 45 of the membrane elements 36, whereas in a sixth embodiment, as shown in FIG. 14, spacer sections 61a and 61b may be integrally formed with a filtration plate 44 of a membrane element 36. In this case, filtration membranes 45 are each divided in two from the points of the spacer sections 61a and 61b and are joined to the filtration plate 44.

(Seventh Embodiment)

Figure 15:
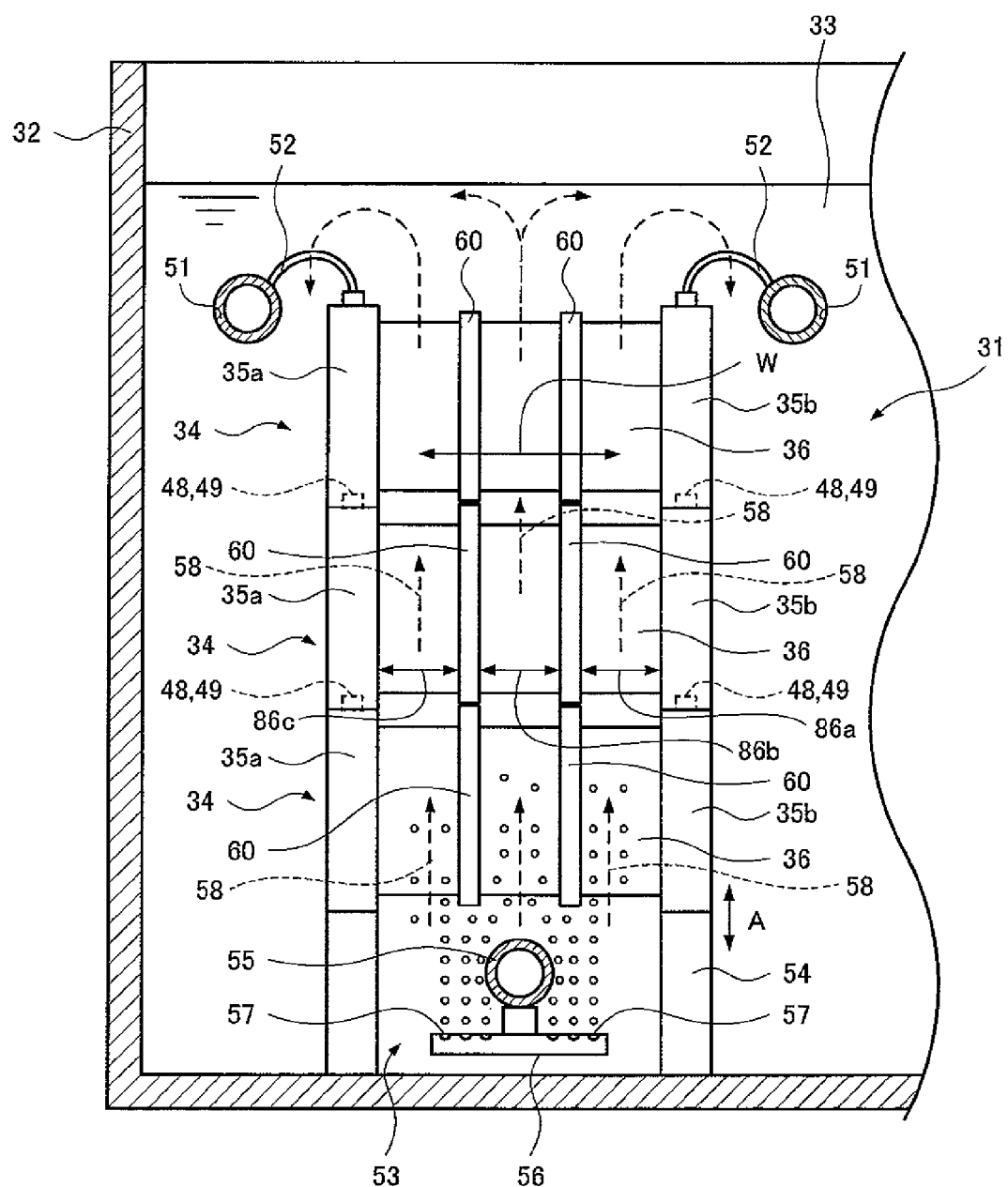
FIG. 15 is a front view showing a submerged membrane separation device according to a seventh embodiment of the present invention.

In the first to fourth embodiments, as shown in FIGS. 1, 6, 8, and 10, the spacing member 60 is attached to a central part in width direction W of the membrane element 36, whereas in a seventh embodiment, as shown in FIG. 15, spacing members 60 may be attached to two points in width direction W of a membrane element 36.

In this configuration, the spacing members 60 and water collecting cases 35a and 35b divide the area of upward flows 58 into three sections 86a to 86c in the width direction W of the membrane element 36. The upward flows 58 flow along the membrane surfaces of the membrane elements 36 in the sections 86a to 86c separated by the spacing members 60, thereby suppressing concentration of the upward flows 58 in the width direction W of the membrane element 36. Particularly, it is possible to prevent the upward flows 58 from concentrating near the water collecting cases 35a and 35b as the upward flows 58 move upward in the central section 86b. Thus the upward flows 58 are not reduced in the central part in the width direction W of the membrane element 36, thereby achieving the sufficient membrane surface cleaning effect of the upward flows 58 in the width direction W of the membrane element 36.

(Eighth Embodiment)

Figure 16:
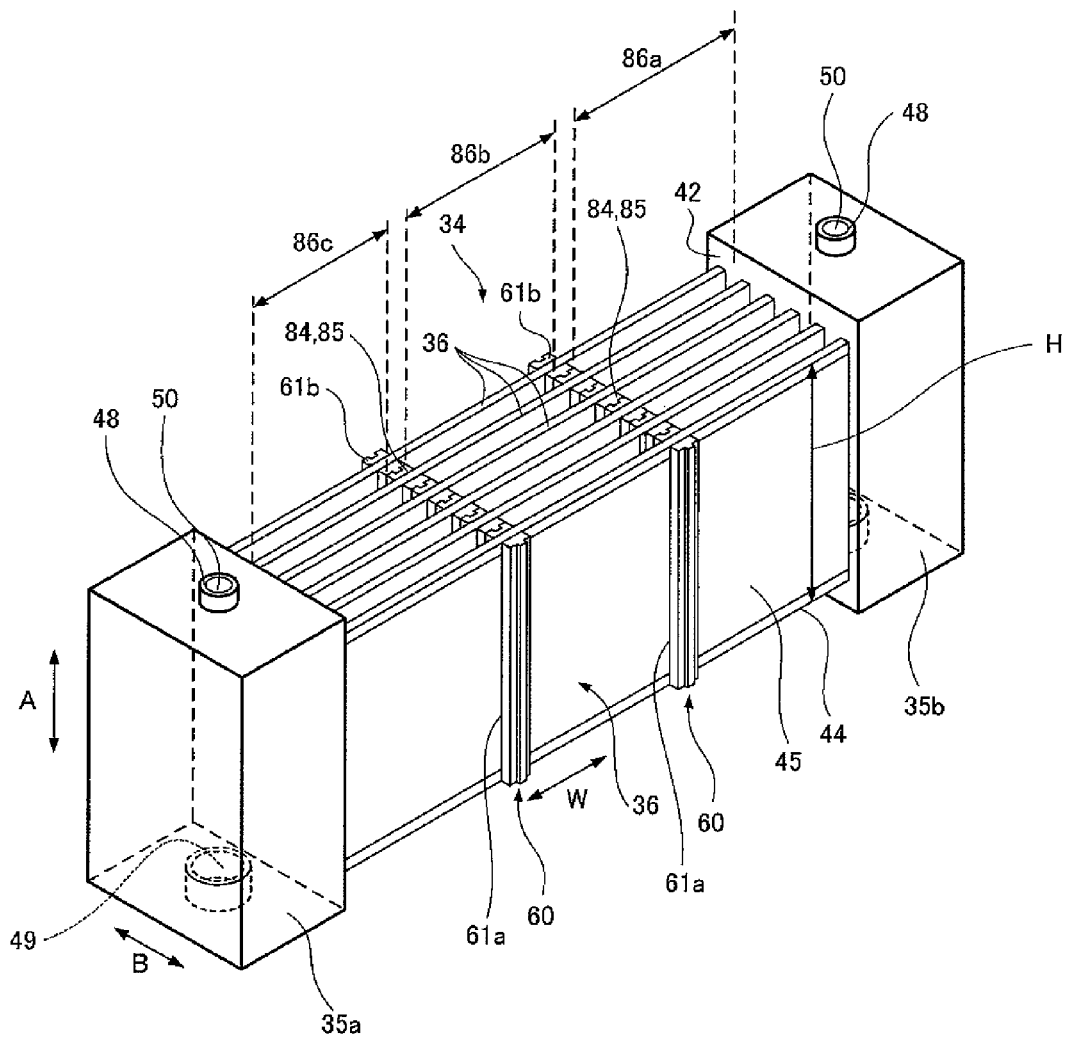
FIG. 16 is a perspective view showing a membrane module according to an eighth embodiment of the present invention.

In the fifth and sixth embodiments, as shown in FIG. 12, the spacing member 60 is attached to a central part in width direction W of the membrane element 36, whereas in an eighth embodiment, as shown in FIG. 16, spacing members 60 may be attached to two points in width direction W of a membrane element 36 as in the seventh embodiment.

Thus the same effect as the seventh embodiment can be obtained.

In the seventh and eighth embodiments, the spacing members 60 are attached to two points in the width direction W of the membrane element 36 to form the three sections 86a to 86c. The spacing members 60 may be attached to three or more points to form at least four sections.

(Ninth Embodiment)

Figure 17A:
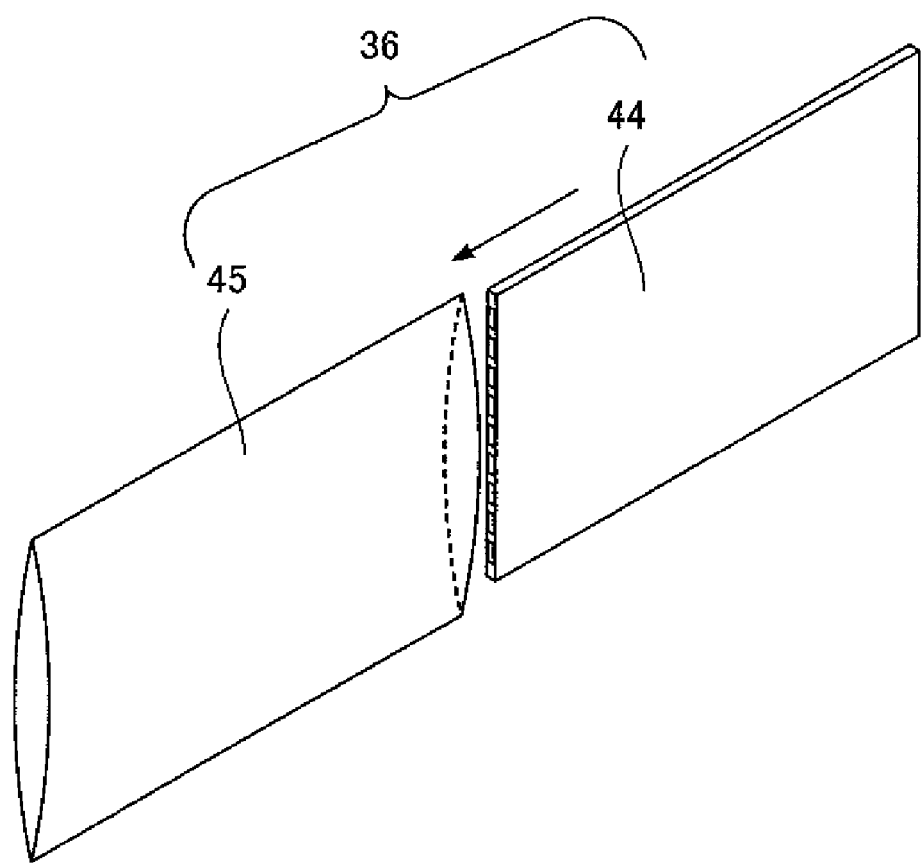
FIG. 17A is an exploded perspective view showing a membrane element of a membrane module according to a ninth embodiment of the present invention, the membrane element having a loop filtration membrane.
Figure 17B:
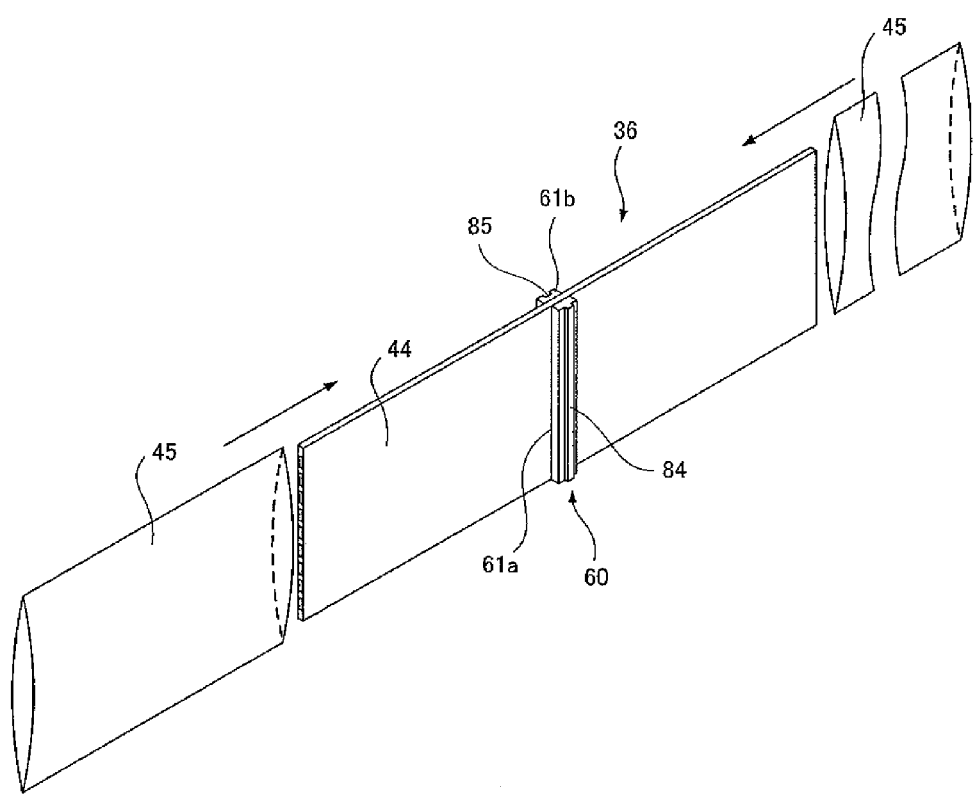
FIG. 17B is an exploded perspective view showing the membrane element of the membrane module according to the ninth embodiment of the present invention, the membrane element having a loop filtration membrane divided in two.

In the first to eighth embodiments, the filtration membranes 45 are respectively joined to the front and back sides of the filtration plate 44, whereas in a ninth embodiment, as shown in FIG. 17A, a membrane element 36 may have a filtration membrane 45 looped over the upper end and the lower end of a filtration plate 44. In the case where the looped filtration membrane 45 is adapted to the sixth embodiment (see FIG. 14), as shown in FIG. 17B, the looped filtration membrane 45 is divided in two at the points of spacer sections 61a and 61b.

In the foregoing embodiments, the points of the attached spacing members 60 of the upper membrane module 34 and the points of the attached spacing members 60 of the lower membrane module 34 are aligned with each other in the width direction W of the membrane element 36. The spacing members 60 may not be aligned with each other. Further, the number of attached spacing members 60 in the upper membrane module 34 is equal to the number of attached spacing members 60 in the lower membrane module 34 in the width direction W. The number of spacing members 60 may vary between the upper and lower membrane modules 34.

In the seventh and eighth embodiments, the spacing members 60 are provided in parallel. The distances between the spacing members 60 may vary between the upper part and lower part in the width direction W of the membrane element 36. For example, the spacing members 60 may be diagonally arranged (may not be in parallel) such that the distances between the spacing members 60 decrease toward the upper part. Alternatively, the spacing members 60 may be diagonally arranged (may not be in parallel) such that the distances between the spacing members 60 increase toward the upper part.

Figure 18:
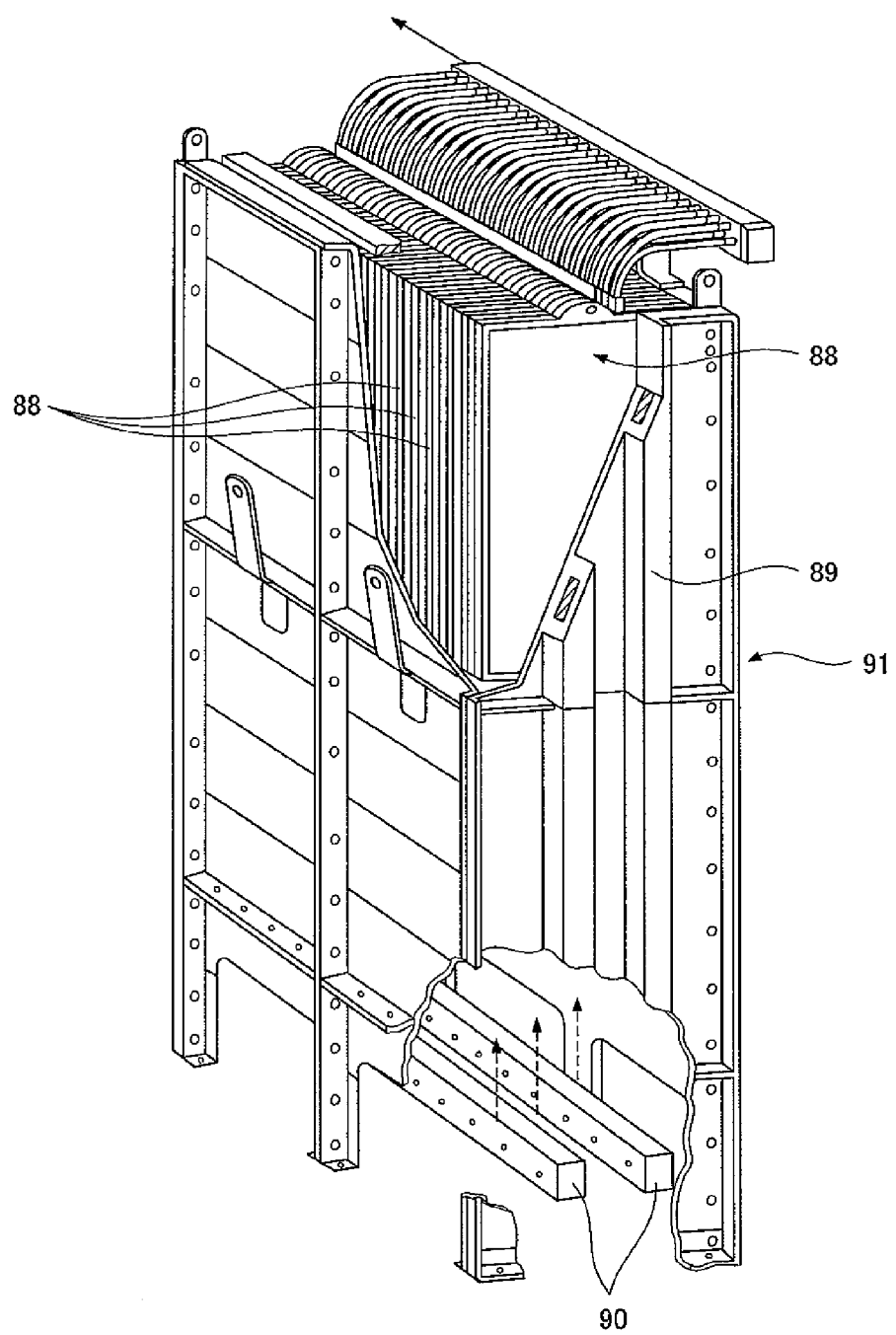
FIG. 18 is a partially cut perspective view showing a submerged membrane separation device having a different configuration from the submerged membrane separation devices according to the first to ninth embodiments of the present invention.
Figure 19:
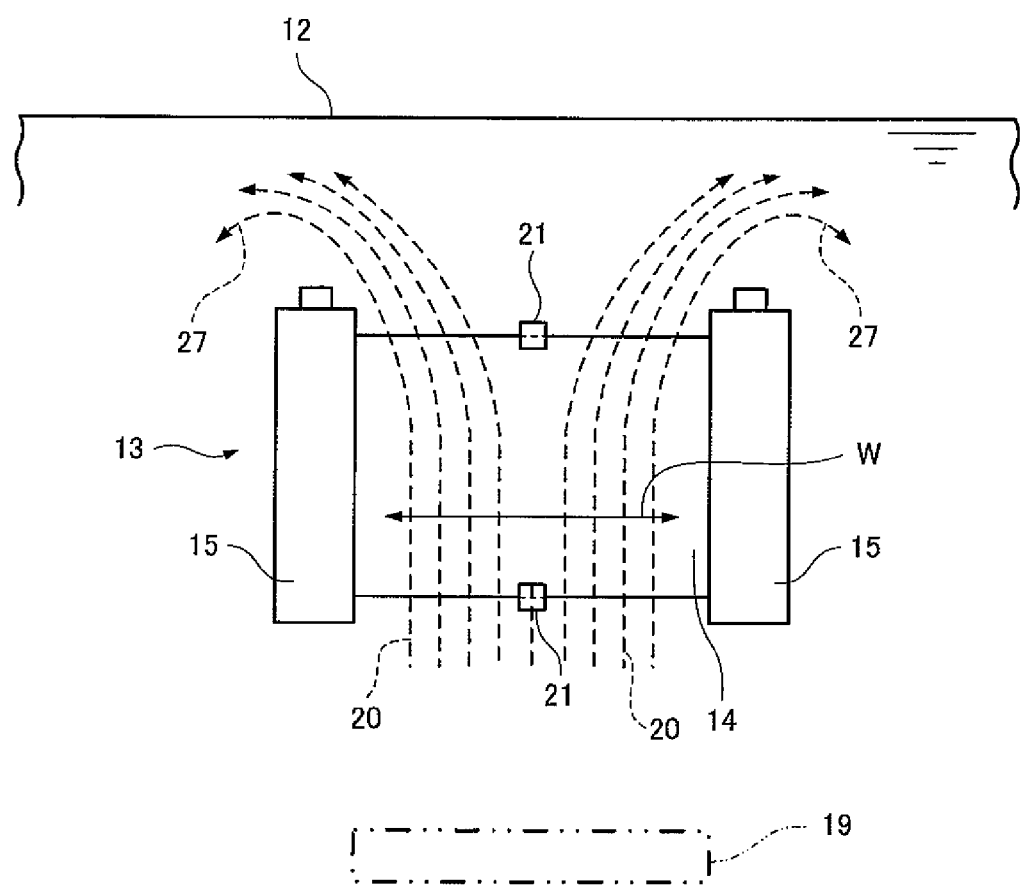
FIG. 19 is a front view showing a submerged membrane separation device having attached spacing members according to the related art.
Figure 20:
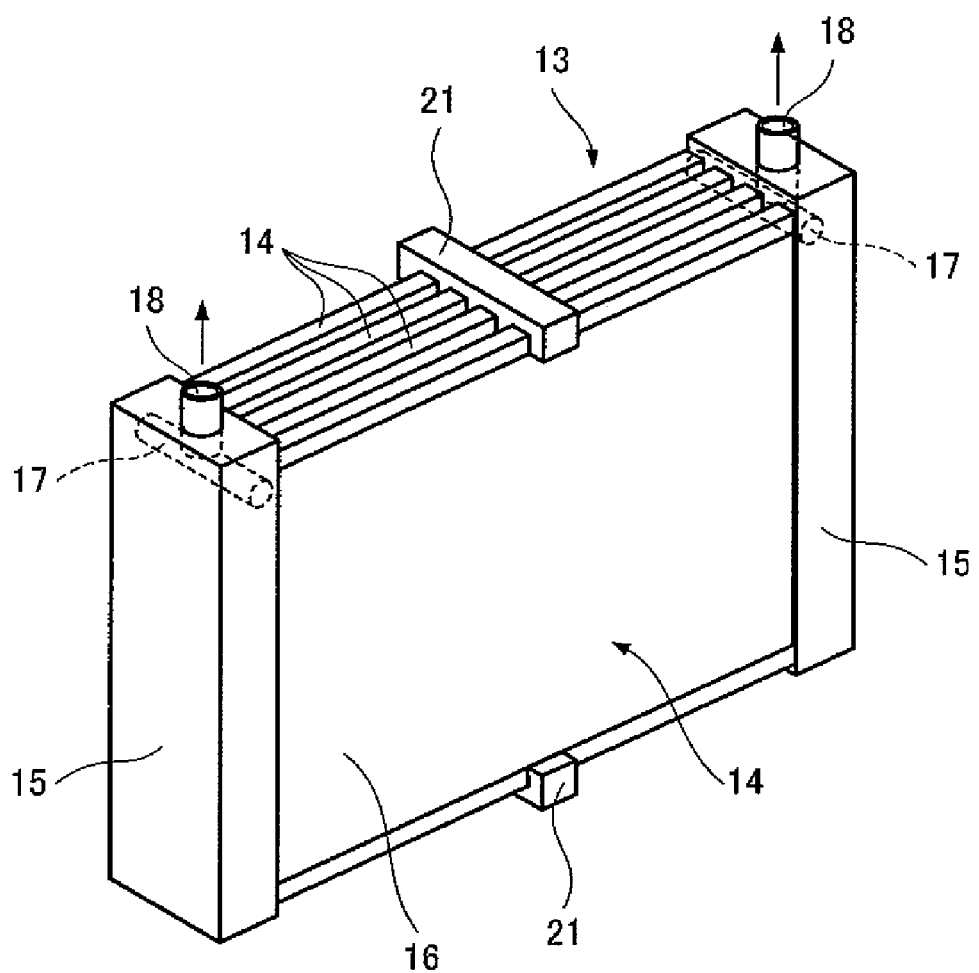
FIG. 20 is a perspective view showing the submerged membrane separation device having the attached spacing members, according to the related art.
Figure 21:
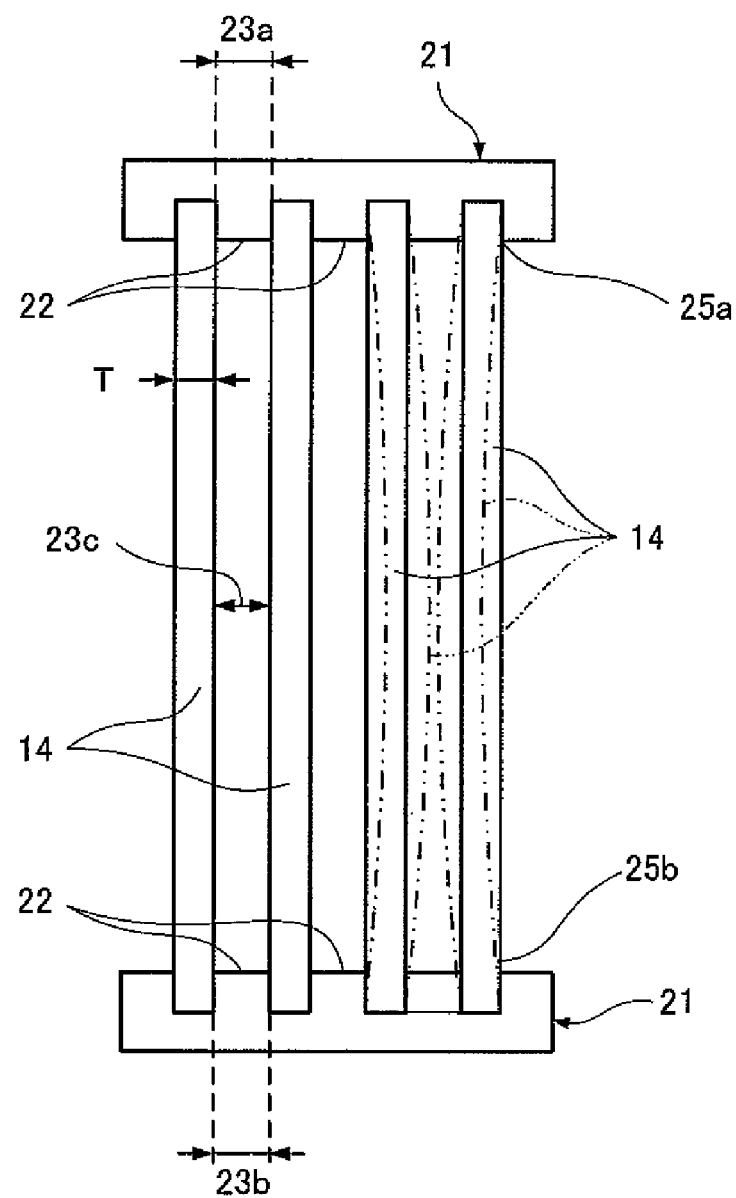
FIG. 21 is a side view showing the spacing members and membrane elements, according to the related art.

In the foregoing embodiments, the submerged membrane separation device 31 includes the membrane modules 34 each of which has the water collecting cases 35a and 35b on both sides. The present invention is not limited to this configuration. For example, as shown in FIG. 18, a submerged membrane separation device 91 may be used in which the water collecting cases 35a and 35b are not provided, multiple membrane elements 88 are removably accommodated in a case 89, and an air diffuser 90 is provided below the membrane elements 88. Alternatively, the submerged membrane separation device may include a membrane module in which the sides of the membrane elements 88 are contacted with each other to combine the membrane elements 88.

In the foregoing embodiments, the membrane surface cleaning streams are the upward flows 58 generated in a gas-liquid phase by air diffused from below the membrane elements 36. The membrane surface cleaning streams may be flows generated by an impeller along the surfaces of the filtration membranes 45 (that is, flows substantially parallel to the surfaces of the filtration membranes 45), the flows including upward flows, downward flows, and horizontal flows. The flow generating device and the arrangement direction of the membrane elements 36 are not particularly limited. For example, in the case where the membrane elements 36 are horizontally arranged and the membrane surface cleaning streams flow in the horizontal direction, the spacer sections are horizontally disposed across the membrane element between the membrane elements 36.

In the foregoing embodiments, the permeated water passages are formed on the front and back sides of the filtration plate 44 of the membrane element 36. The configuration of the filtration plate 44 is not particularly limited. For example, the filtration plate 44 may include: a permeated water passage having a hollow part, and a hole communicating with the permeated water passage from the front and back sides. Alternatively, the overall filtration plate 44 may be composed of a porous member having permeability.

The invention claimed is:

1. A spacing member keeping spacing between filtration membranes of membrane elements arranged with the filtration membranes opposed to each other, the membrane element having the filtration membranes on a flat part of the membrane element, the spacing member comprising at least one spacer section keeping the spacing between the filtration membranes between the membrane elements across the membrane element in a direction of a membrane surface cleaning stream flowing along a filtration membrane surface of the membrane element, wherein the at least one spacer section is a member different from the membrane element, the at least one spacer section is disposed between the membrane elements over a height of the membrane element, and the spacing member divides an area wherein the membrane surface cleaning stream flows into at least two sections in a width direction of the membrane element.

2. The spacing member according to claim 1, wherein the at least one spacer section is detachably attached to the membrane element.

3. The spacing member according to claim 2, wherein the at least one spacer section comprises multiple spacer sections, each being disposed between the different membrane elements.

4. The spacing member according to claim 1, further comprising a fastening device for fastening the at least one spacer section on the membrane element.

5. A submerged membrane separation device comprising the membrane elements and the spacing member according to claim 1, the membrane elements being submerged for membrane filtration in a liquid to be treated, the spacing member keeping the spacing between the membrane elements, the submerged membrane separation device further comprising an air diffuser below the membrane elements, the air diffuser diffusing air to generate upward flows as membrane surface cleaning streams, the upward flows cleaning the filtration membrane surface.

* * * * *